United States Patent
Schauer

[19]

[11] Patent Number: 6,107,762
[45] Date of Patent: Aug. 22, 2000

[54] SPEED CONTROL DEVICE FOR ELECTRICAL MOTOR-DRIVEN APPARATUS

[75] Inventor: Ronald V. Schauer, Gilroy, Calif.

[73] Assignee: S-B Power Tool Company, Chicago, Ill.

[21] Appl. No.: 08/597,343

[22] Filed: Feb. 6, 1996

[51] Int. Cl.[7] .................................................. H02K 23/64
[52] U.S. Cl. ......................... 318/245; 318/811; 318/603; 318/607
[58] Field of Search .................................... 318/809–815, 318/244–245, 254, 774, 606–608, 698, 685, 599–603

[56] References Cited

U.S. PATENT DOCUMENTS

| | | |
|---|---|---|
| 3,209,228 | 9/1965 | Gawron . |
| 3,327,196 | 6/1967 | Sahrbacker . |
| 3,329,842 | 7/1967 | Brown . |
| 3,422,330 | 1/1969 | Swanke . |
| 3,447,057 | 5/1969 | Brown et al. . |
| 3,484,632 | 12/1969 | Opalenik . |
| 3,596,161 | 7/1971 | Raymond et al. . |
| 3,641,410 | 2/1972 | Vogelsberg . |
| 3,678,357 | 7/1972 | Raymond et al. . |
| 3,887,856 | 6/1975 | Chicchiello . |
| 4,255,695 | 3/1981 | Plunkett et al. .......................... 318/723 |
| 4,271,379 | 6/1981 | Eckelmeyer ................................ 318/77 |
| 4,321,478 | 3/1982 | Plunkett et al. ........................ 318/150 |
| 4,454,459 | 6/1984 | Siegfried . |
| 4,536,688 | 8/1985 | Roger . |
| 4,587,588 | 5/1986 | Goldstein ................................ 361/54 |
| 4,626,952 | 12/1986 | Morikawa ................................ 361/55 |
| 4,636,961 | 1/1987 | Bauer . |
| 4,734,629 | 3/1988 | Lessig et al. . |
| 4,858,054 | 8/1989 | Franklin .................................. 361/57 |
| 5,440,215 | 8/1995 | Gilmore .................................. 318/432 |
| 5,602,449 | 2/1997 | Krause et al. .......................... 318/254 |
| 5,672,945 | 9/1997 | Krause .................................... 318/434 |

*Primary Examiner*—David Martin
*Attorney, Agent, or Firm*—Greer, Burns & Crain, Ltd.

[57] ABSTRACT

A speed control device particularly adapted for use with electrical motor-driven apparatus, stationary tools and hand tools having digital operator input controls. A semiconductor switching device controls a percentage of ON time for the electric motor in the electric motor-driven apparatus. Discrete and repeatable settings are selectable to a user through digital input switches.

13 Claims, 1 Drawing Sheet

SPEED CONTROL DEVICE FOR ELECTRICAL MOTOR-DRIVEN APPARATUS

BACKGROUND

1. Field of Invention

This invention relates to a speed control device for regulating the operating speed of electric motor-driven apparatuses, particularly, but not limited to, power tools and hand tools.

2. Description of Prior Art

Quite often it is required that the operating speed of an apparatus or power tool be varied and regulated by electrical means.

Early electric motor speed control methods employed a plurality of windings, variable series-connected resistances, or variable voltage output transformers to control the operating speed of the apparatuses or tool. Variations on this theme include U.S. Pat. Nos. 3,596,161 and 3,678,357 both to Raymond and Swanke (1969 and 1970, respectively) which include the provision of multiple windings or winding taps and a means of selection by which combinations of windings or taps in series or parallel could be connected, thus varying the operating speed of the apparatus. The addition of a solid-state rectifier that could be switched into a series connection with the motor windings provided additional speed settings by selectively allowing only one polarity of the AC power source half cycles to provide power for the motor. These methods tend to be bulky and may require many wiring connections, a complex electrical switch, as well as requiring complex motor coil winding methods. These factors make them unacceptable for many types of tools, especially where small size is of importance such as in the case of typical power and hand tools. These two patents are directed to and particularly well suited for kitchen blenders. These particular patents are mentioned as background only, as they do not embody modulation of the incoming power source as a control means.

More advanced speed control methods provide for variable modulation of the incoming power source by controlling the conduction timing of a semiconductor control device or a multitude of such devices connected in series with the motor winding or windings. U.S. Pat. No. 3,209,228 to Gawron (1965) is an early example of an embodiment of this concept, employing a silicon thyristor, a voltage trigger device, and a resistor-capacitor timing network. By varying the resistor value, the conduction timing of the thyristor may be varied, thus controlling the average voltage applied to the motor of the apparatus. U.S. Pat. No. 3,327,196 to Sahrbacker (1967) incorporates the same concept, but includes a different voltage trigger device. U.S. Pat. No. 3,329,842 to Brown (1967), U.S. Pat. No. 3,447,057 to Brown et al (1969), and U.S. Pat. No. 3,484,632 to Opalenik (1969) also describe variations on the same basic concept, but specifically as applied to power tool control "trigger"-style switches. These patents all feature an analog (infinitely variable) means of operator input, typically comprising a variable position "trigger" button. None encompass any form of discreet power level input selections, nor any form of output load or speed compensation.

U.S. Pat. No. 3,422,330 to Swanke (1965) provided discreet power level input selections in the form of a plurality of mechanical switches that provided for varying combinations of resistances as applied to a basic resistor-capacitor timing method. This is another variation on U.S. Pat. No. 3,209,228 previously mentioned, and also seems to be primarily intended for application to kitchen blenders.

Typical speed control methods prior to the present have employed open-loop control techniques, providing no means of speed compensation for varying power source or output load conditions. As one example of the desirability of such a feature, in the case of a cutting or drilling apparatus, the cutting tool may become jammed in the workpiece if the power output from the tool is not rapidly adjusted in compensation for varying load conditions. Problems of this nature are particularly troublesome at lower operational speeds. The response time required to prevent such jams is generally much shorter than a human operator can reliably perform. Automatic closed-loop speed compensation is therefore desirable. U.S. Pat. No. 4,454,459 to Siegfried (1981) and U.S. Pat. No. 4,734,629 to Lessig, Wheeler, Bailey and Smith (1988) both describe closed-loop motor load compensations based upon sensing the motor's rotational speed. The second is a variation of the concept of the first, and neither one provides a means for sensing or limiting output power overload conditions. They are also analog-logic based, as with the basic thyristor-based patents previously mentioned, and utilize a relatively costly feedback means (a tachometer generator).

Few previous speed control methods have provided for discreet electronic incremental control of the motor speed. U.S. Pat. No. 3,641,410 to Vogelsberg (1972) describes a "touch" control method which varies the output power based upon the location of an operator's finger contact upon variable resistance elements, or in another embodiment, based upon the operator's touch of one or more of several discreet touch points. U.S. Pat. No. 4,536,688 to Roger (1985) describes a system for selecting from predetermined speeds by means of a rotary selection switch in association with a mechanical ratio changing method. U.S. Pat. No. 4,636,961 to Bauer (1984) describes a control with a memory device (ROM) containing preset values for controlling a motor in an electric power tool. Vogelsberg's method (U.S. Pat. No. 3,641,410) does not provide for safety isolation of the operator from the power source, and does not provide for reproducible output speed settings when the operator's touch pressure or position varies. It also does not allow operations without the operator maintaining contact with the control touch points. Roger's method (U.S. Pat. No. 4,536,688) is at least partially mechanically based, and accordingly does not address smaller hand tools or the vast majority of cutting tools in which changeable drive ratios are too costly, impractical or otherwise undesirable. It is further limited to a very few speed settings and does not provide an incremental speed selection method. Bauer's method (U.S. Pat. No. 4,636,961) implies selection of the preset values as "material types" and does not describe provisions for incremental control during operation, appearing to be intended for stationary power tools such as drill presses, and thus also failing to address the needs of smaller hand tools.

Nearly all previous speed control methods have utilized analog operator input technologies, primarily sliding wiper potentiometers in one form or another. Because potentiometers are mechanical devices having sliding contacts, it is unavoidable that the resistive element and the sliding contact operating upon it should experience wear due to friction. Such wear will cause drift of the circuit's operating parameters, eventually leading to erratic operation or outright failure of the control circuit. U.S. Pat. Nos. 3,641,410, 4,536,688, and 4,636,961 as previously mentioned, do provide for discreet ("digital") inputs for control of output power levels, but they do not provide for simple "up-down" incremental control with reproducible settings.

U.S. Pat. No. 3,887,856 to Chicchiello (1975) does describe a pushbutton "up-down" speed control method.

Although providing this function, it is "infinitely" variable, providing neither reproducible speed settings, nor discreet incremental control. In addition, it is based upon a purely analog control method and is therefore subject to drift. No memory of previously selected settings is provided. There is no compensation provided for the motor load. Finally, it is specifically intended and suited for control of film drive motors, and not for power tools or for general apparatus usage.

Active displays have not normally been provided to indicate the currently selected control output settings. U.S. Pat. Nos. 4,536,688 and 4,636,961 as previously described do provide for displays, but the former is at least in part associated with a mechanical means of selecting the output speed (mechanical ratio selections), and the latter is more of a "material type selection" display, not necessarily a speed selection display. The latter is also based upon a few fixed values stored in a fixed memory device rather than an operator-selectable setting from within a larger range.

All the speed control control methods previously described suffer from one or more of the following deficiencies, as applicable to electrically motor-driven apparatus, tools, and hand tools:

1. No "memory" of the power or motor speed settings previously selected have typically been provided except for the adjustable mechanical limit stops provided on many trigger-style speed controls. Where provided, the mechanical limit stops are themselves subject to mechanical wear and can be inconvenient to adjust when performing work with the apparatus or tool. Presence of said preset mechanical limit stops are also not conducive to regulation of the apparatus output speed under varying input power or output load conditions.

2. No automatic safety mechanisms to protect against motor overspeed in the event of a shorting failure of the semiconductor control device or devices have been provided by any of the previously mentioned methods, allowing a potential safety hazard to exist for the operator of the apparatus. In applications where universal or brush-equipped DC motors are used, such failures may lead to sudden unexpected motor overspeeds and uncontrolled accelerations.

3. No mechanisms to limit the maximum output power or torque have been provided, thus failing to protect the motor from overload or stalling conditions. This also allows a potential safety hazard to exist for the operator of the apparatus.

4. Previous analog-based methods have required adjustments of the circuit and/or its component values at time of manufacture to compensate for different line frequencies and voltages provided in various parts of the world. In some instances, entirely different versions of the circuitry have been required to adapt to varying local power source conditions.

5. Previous analog methods typically require the trimming of circuit elements at time of manufacture under simulated or actual operating conditions. This is normally necessary in order to obtain consistent control output levels, and is due in large part to variations in circuit component values.

6. Previous methods typically have not provided a smoothly ramped turn-on function. That is to say that they either switched on immediately to a selected output power level, or have provided no positive means to limit the acceleration of the apparatus' motor from rest to the desired operating speed. Rapid, uncontrolled accelerations may cause input power surges, premature wear of the motor's brushes (if so equipped), and significant turn-on torques from the acceleration of the motor armature. Motor torques will be transmitted to the operator or to the framework of the apparatus. Turn-on torques are of particular concern in the case of larger or more powerful hand tools because they may cause the operator to momentarily lose physical control of the tool, thereby creating an operator safety hazard. In applications involving cutting tools such as routers and saws, said turn-on torques may also lead to undesired roughness or misplacement of cuts on the work piece, even where the tool is mounted securely to a stationary framework. The same concerns are applicable as regards to smoothly ramping between selected speeds.

7. Previous methods have typically not provided a means to re-enable or retrigger the semiconductor switching device or devices should their operation be interrupted due to momentary mechanical interruption of the motor's power circuit. Interruptions of this type are typically caused by brush bounce in brush-type motors. Where semiconductor thyristor switching devices are used, said interruptions may cause the devices to switch off prematurely, thereby contributing to erratic operation of the apparatus or tool.

OBJECTS AND ADVANTAGES

Accordingly, several separate objects and advantages of the present invention are:

1. to provide a simple, reproducible operator input method consisting of UP, DOWN, ON and OFF switches;

2. to provide a memory of the apparatus' output speed or power level from prior usage or usages thus enabling rapid resumption of the previously selected level when so desired;

3. to provide incremental control of the apparatus' output speed or power level by means of brief operations of the UP or DOWN switches, each operation causing the output to increment or decrement by a discreet and predictable amount;

4. to provide smooth up or down ramping of the apparatus' output speed or power level by means of sustained operations of the UP or DOWN switches;

5. to provide a smooth, controlled ramping up of the apparatus' output speed or power level from a fully off condition to a selected level when the ON switch is operated;

6. to optionally require timed, multiple or sustained operation of the ON switch, possibly in combination with other switches, to start the apparatus or tool, this constituting an added safety feature;

7. to provide for immediate cessation of power output to the motor when the OFF switch is operated, thus allowing the apparatus or tool to decelerate to a stop in a minimal amount of time;

8. to limit the minimum and maximum allowable apparatus output speed or power level by limiting the allowable power output levels that may be selected by means of the UP and DOWN pushbuttons;

9. to compensate for changes in the operating output load of the apparatus or tool by sensing the electrical power being consumed by the motor and using the information to adjust the control's output power level appropriately, thereby helping to maintain the selected operating speed of the motor;

10. to limit the maximum allowable output power for the apparatus or tool by sensing the electrical power being consumed by the motor and using the information obtained to limit the power output from the control appropriately;

11. to sense failure of the semiconductor switching device or devices which in turn control power to the motor, and then having sensed such a failure, to utilize a secondary switching device from an electrical connection across the motor and semiconductor switching device or devices, thereby causing a fusible element in series with the incoming power source to open, thereby effecting a cessation of operation of the apparatus;

12. to provide reproducible discreet control values and a precision control method by utilizing a digital phase-locked-loop or a similar digital method to synchronize the internal control circuitry to the power source regardless of its exact frequency;

13. to reduce or eliminate the effects of production tolerances and drift of component values by utilizing digital control techniques as opposed to analog techniques;

14. to provide a number of available configurations within the speed control circuitry itself, selectable by means of the operator-accessible switches in special combinations of operation, or to utilize additional control inputs, or to automatically sense the power source voltage and frequency, or to utilize combinations of the preceding, the intent being to adapt the speed control circuitry to varying power source conditions while reducing or eliminating physical or electrical modifications to the speed control circuitry otherwise required for this purpose;

15. to provide a re-enable or re-trigger function for the semiconductor switching device or devices to compensate for momentary disruptions of the motor power circuit such as caused by motor brush bounce.

DETAILED DESCRIPTION OF THE INVENTION

Figure 1:
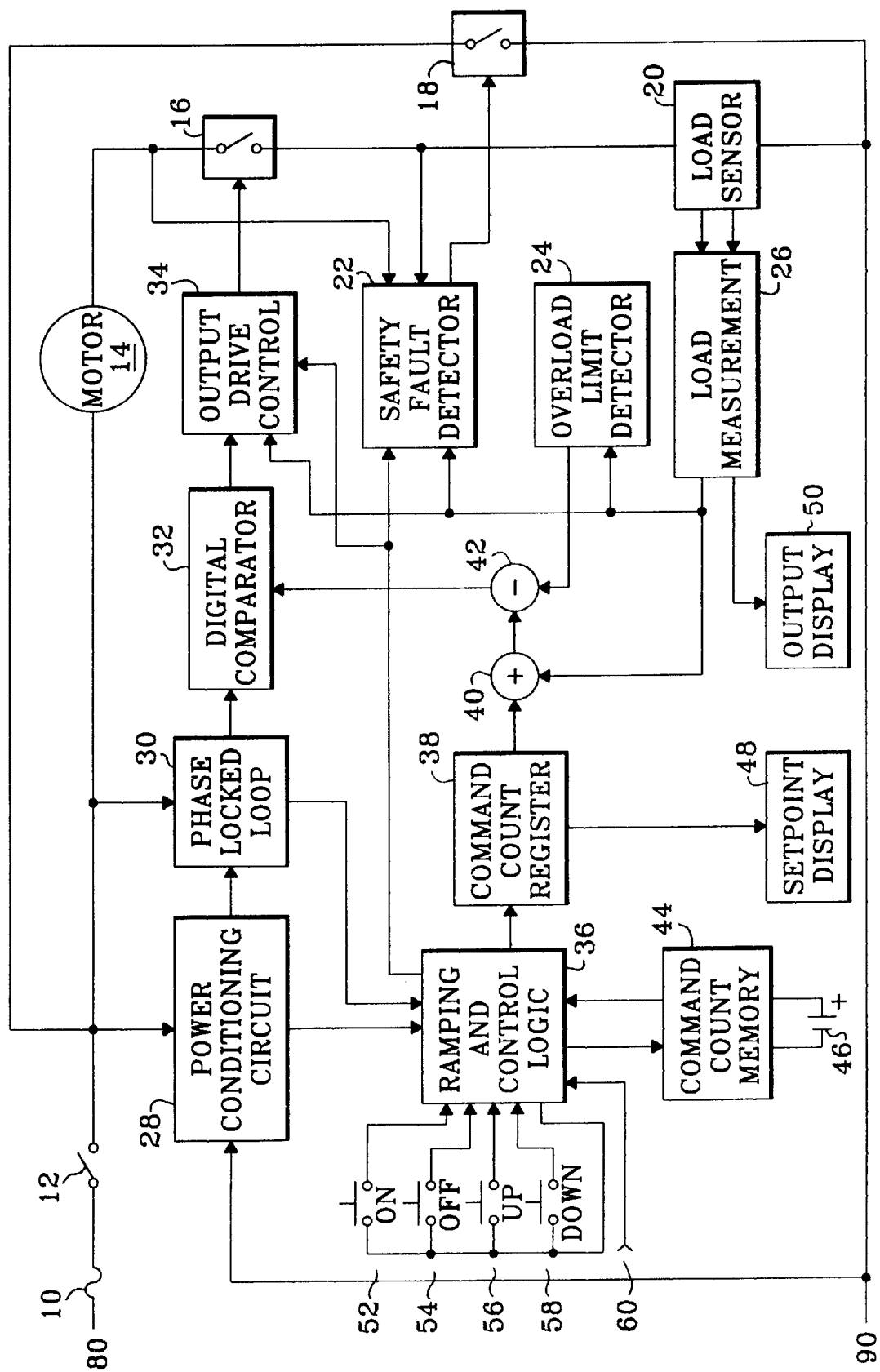
FIG. 1 is a block diagram of the preferred electric motor speed control circuit.

The preferred embodiment of this electric motor speed control circuit 8 is illustrated in FIGURE, and is applied to a series-wound "universal" motor 14. The circuit may control many types of motors, however, such as permanent magnet style motors, stepping motors, and variable reluctance or "brushless" multi-phase motors. Other embodiments of the control circuitry which achieve the control of the invention might include combinations of discreet logic devices, single integrated circuits, combinations of integrated circuits, and software implementations of the logic of the FIG. 1 circuitry as may be applied to microprocessors or microcontrollers.

Alternating current power (AC) is supplied to the control from AC power source 80 and AC power return 90. The voltage and frequency of power may vary depending upon the locality in which it is obtained. The power is limited in current by fusible element 10. The power may (optionally) also be blocked by means of power disconnect switch 12. Power conditioning circuit 28 serves principally to derive voltages required for operation of the control circuitry from said power source.

Motor 14 is connected in series with fusible element 10 and optional power disconnect switch 12 to AC power source 80 and further connected in series with semiconductor switching device 16, then to motor load sensor 20, and finally to AC power return 90. In normal operation, with the switch closed and the semiconductor switching device 16 enabled, electrical current will flow from the power source 80 through the motor 10, then through motor load sensor 20 to power return 90, thereby completing an electrical circuit and enabling the motor 14 to produce output rotation and torque. By means of the current flowing through the motor load sensor 20, a signal is generated which represents the present output load of the motor 14. That signal is utilized as an input to load measurement amplifier 26. The amplifier 26 also transforms the signal into a digital representation of the motor load. The digital representation is used as a control input by other functions within the control circuit 8.

In order to control motor 14's output speed or power, it is necessary to modulate the conduction of semiconductor switching device 16. One possible alternate is to control the conduction state timing of the semiconductor switching device 16 relative to the AC power line input. In order to accomplish this as a digital method, the time period of individual incoming AC power cycles is divided into a uniform number of time increments. This division is accomplished by means of digital phase locked loop 30 which derives its source signal reference from the AC power line input. The digital phase locked loop will provide an output that is a fixed multiple of the frequency of the AC power line input, thus providing an automatic tracking and adjustment method. The output of the digital phase locked loop is available as a cyclic count. The cyclic count may be compared to a reference count value by digital comparator 32, and thereby used to enable or disable the semiconductor switching device 16 by means of output control drive 34. By this method, the conduction state timing of semiconductor switching device may be precisely controlled relative to AC power power line input. In alternate embodiments of the invention, the function of the digital phase locked loop may be replaced with oscillators and counters, or other circuits capable of providing a cyclic count output that is synchronized to said AC power line input.

As mentioned, the cyclic count output from digital phase locked loop 30 represents equal numbers of counts per AC power line input cycle. A reference count value is supplied by command count register 38, modified by digital adder 40 and digital subtractor 42, and then compared to the cyclic count output by digital comparator 32, and results in stable output timing from the digital comparator 32. By this method, variations in circuitry component values are reduced or eliminated from affecting the timing of semiconductor switching device 16. Circuit adjustments and compensations for component parameter drift and temperature variations should therefore be avoided.

The reference count value for digital comparator 32 is obtained by summing the output of command count register 38 with the digital output of load measurement amplifier 26 by means of the digital adder 40, and then also subtracting the digital output of the overload limit detector 24 by means of the digital subtractor 42. The digital output of the load measurement amplifier 26 increases in magnitude as motor 14's output load increases. The digital output of the overload limit detector 24 represents the excess output of the load measurement amplifier over 26 and above a reference limit value fixed within the overload limit detector 24. The reference limit represents the maximum allowable motor load. Increasing reference count values will cause larger percentage on times for semiconductor switching device 16, thereby causing increasing amounts of power to be supplied to motor 14. Conversely, decreasing reference count values will cause smaller percentage on times and smaller amounts of power to be supplied to said motor.

The command count value contained in the command phase angle register 38 is controlled by the output of ramping and control logic 36. The ramping and control logic utilizes input information from ON switch 52, OFF switch 54, UP switch 56, DOWN switch 58, power conditioning circuitry 28, digital phase locked loop 30 and optional configuration selection inputs 60. Operation of the ON switch will cause the logic to cause the command count register 38 to be loaded with a count value representing a minimum power output for the control, will enable output drive control 34, and then will allow the ramping and control logic 36 to increase the count value up to the value contained in command count memory 44 over a period of time. This effects a power-on ramping method. Operation of the OFF switch will cause said command command count register 38 to be loaded with a count value representing a minimum power output for the control, and will disable the output drive control. Momentary operations of the UP or DOWN switches cause the command count register's contained count value to be incremented or decremented by a discreet amount per each operation of the switches, limited to within predetermined minimum and maximum value limits. Sustained operations of the UP or DOWN switches cause the command count register's contained count value to be ramped up or down for the duration of switch operations also limited to within the predetermined minimum and maximum value limits. In typical embodiments of this control circuit, the command count memory 44 will be updated by the operations of the switches. Outputs from the power conditioning circuitry 28, the digital phase locked loop 30, and the optional configuration selection inputs may be used by the ramping and control logic 36 to select the predetermined minimum and maximum value limits from a group of predetermined limits, or to determine them directly. Other possible functions of the selection may include operation of special combinations of the ON, OFF, UP and DOWN switches 52, 54, 56, 58 to select among the predetermined limits.

Sustained operation, momentary operation for a period of time, multiple operations, or a combination of the operations may optionally be required of ON switch 52 singly or in combination with other switches in order to initiate power output to motor 14, this constituting an operator safety feature. Other embodiments may include mechanical guarding, shielding, or locking of the ON switch to prevent inadvertent starting of the apparatus or tool. Power disconnect switch 12 may be optionally be present in the circuit to provide an additional safety feature.

ON switch 52, OFF switch 54, UP switch 56, and DOWN switch 58, are digital in nature, having only two states; conducting or non-conducting. Preferably, the switches are momentary in nature, each being in a conducting state only while the operator is specifically operating them. Being digital in nature, the switches are relatively insensitive to mechanical wear and ambient electrical noise, thereby embodying an improvement over previous analog command input methods such as potentiometers and other types of variable resistance elements.

Command count memory 44 may be sustained by optional internal power source 46 to retain information during loss or disconnection of the AC input power 80. The information may represent recently selected motor power speed and power settings, minimum and maximum allowed values, and similar information that may be utilized by ramping and control logic 36 in its functions.

Output drive control 34 contains logic and hardware to drive semiconductor switching device 16 or in other embodiments, a plurality of such devices. The output drive control's inputs include control outputs from digital comparator 32, information from load measurement amplifier 26, and control outputs from ramping and control logic 36.

The output drive control 34 may optionally contain logic to repetitively re-enable the semiconductor switching device or devices as necessary during times when the device has been commanded to be enabled, if the output drive control 34 determines from its inputs that the switching device 16 is not actually enabled. The logic output drive control preferably embodies a feature which compensates for undesired loss of conduction, for example, a loss due to brush bounce in motor 14 should it be equipped with electrical brushes. Such compensation provides for smoother operation of the apparatus or tool driven by the motor 14. Information for this compensation may be obtained from conductive states of the semiconductor switching device at 10, which may be sensed by monitoring the voltage drop across the device or by detecting the flow of current through the motor circuit through load sensor 20 and the load measurement amplifier 26. Other means or combinations of means of monitoring the conductive states of the semiconductor switching device 16 are possible.

Safety fault detector 22 controls the function of the switching device 18. The switching device may be a device similar to semiconductor switching device 16, but other switches may also be used. Ramping and control logic 36 provides signals to the safety fault detector indicating the current circuit status, including but not limited to "on" or "off" status. When the signals indicate that the circuit is in an "off" state, the semiconductor switching device is not permitted to be in a conductive state at any time, thus preventing power from being provided to motor 14. The safety fault detector 22 therefore monitors the semiconductor switching device 16 for conductive states. If the conductive states are detected during times when not allowed, a fault condition is determined to exist. The fault condition enables the safety fault detector to in turn cause the switching device 18 to be turned on, thereby causing fusible element 12 to be overloaded briefly and to open electrically. Once the fusible element 12 is electrically opened, operation of the circuit and therefore also of the motor 14, will cease and will not resume.

Setpoint display device 48 and output display device 50 may optionally be utilized to display the command count, adjusted command count, or other information of interest to the operator. Suitable displays include analog-style mechanical displays, visual indicators, audible indicators, tactile indicators, digital numeric displays, bargraph displays, mixed-style displays, and others.

Accordingly, artisans will appreciate that the speed control of this invention provides for all the objects and advantages earlier listed, and additionally that as compared to existing applicable controls

- it should be less costly to manufacture because of its "universal" nature, being adaptable for world-wide line voltages and frequencies (inventory reduction and production consolidation);
- it will provide a greater operational safety margin due to its monitoring of the semiconductor switching device and the presence of an extra switching device capable of stopping all operations of the control if a fault condition is found;
- it should be more reliable in service due to the lack of sliding contacts and the wear to the regulating element that such contacts inevitably cause;
- it will provide more precise and repeatable control, being incremental and digital in nature;
- it will be adaptable to other motor technologies by means of changes in the output drive control circuits.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An electric motor speed control circuit for controlling the operation of an electric motor that is responsive to application of an alternating current power source, comprising:
    frequency sensing means for sensing a frequency of power delivered from the alternating current power source and producing a cyclic digital count corresponding to the sensed frequency;
    a load measurement circuit for producing a digital load count representing a load experienced by the electric motor;
    command count means for producing a command count representing a discrete operational speed of the electric motor;
    reference count means for producing a reference count by combining the command count and the digital load count;
    a comparator for comparing the reference count to the cyclic digital count and producing an output signal synchronized to the cyclic digital count; and
    a semiconductor switching device for controlling a percentage of ON time for the electric motor, said semiconductor switching device modulating in accordance with the output signal from said comparator.

2. The electric motor speed control circuit according to claim 1, further comprising:
    incremental switching means for incrementally adjusting the command count in response to user input.

3. The electric motor speed control circuit according to claim 2, wherein momentary user input to said incremental switching means results in a discreet modification of the command count.

4. The electric motor speed control circuit according to claim 2, further comprising:
    an ON switch;
    an OFF switch; and
    ramping and control logic means for effecting a gradual timed incrementing of the command count from a minimum value to an operational value in response to said ON switch, and for decrementing the command count to the minimum value in response to said OFF switch.

5. The electric motor speed control circuit according to claim 2, wherein said incremental switching means comprise a plurality of switches and the electric motor speed control circuit further comprises:
    a command count memory for storing multiple command count values which are individually selectable through manipulation of said plurality of switches to effect selection of a discrete desired electric motor speed.

6. The electric motor speed control circuit according to claim 5, wherein said command count memory stores a last used command count value permitting resumption of a discrete last used electric motor speed.

7. The electric motor speed control circuit according to claim 1, wherein said frequency sensing means comprise a digital phase locked loop.

8. The electric motor speed control circuit according to claim 1, further comprising:
    an overload limit detector, said overload limit detector receiving the digital load count from the load measurement circuit and producing an excess count by subtracting a stored maximum count from the digital load count when the digital load count exceeds the stored maximum count; wherein
    said reference count means produces said reference count by adding the command count to the digital load count and subtracting the excess count.

9. The electric motor speed control circuit according to claim 8, further comprising an overload display responsive to said overload limit detector.

10. An electric motor speed control circuit for controlling the operation of an electric motor that is responsive to application of an alternating current power source, comprising:
    frequency sensing means for sensing a frequency of power delivered from the alternating current power source and producing a cyclic digital count corresponding to the sensed frequency;
    incremental speed command means for producing a discrete reference count corresponding to a discrete operating speed for the motor;
    synchronizing means for synchronizing the reference count with the cyclic digital count to produce a synchronized timing count; and
    a semiconductor switching device for controlling a percentage of ON time for the electric motor, said semiconductor switching device modulating in accordance with the synchronized timing count.

11. The electric motor speed control circuit according to claim 10, further comprising:
    a digital power UP switch, said UP switch increasing the reference count in response to user input to increase operating speed of the electric motor; and
    a digital power DOWN switch, said DOWN switch increasing the reference count in response to user input to decrease operating speed of the electric motor.

12. The electric motor speed control circuit according to claim 11, further comprising:
    an ON switch;
    an OFF switch; and
    ramping and control logic means for effecting a gradual timed incrementing of the reference count from a minimum value to an operational value in response to said ON switch, and for decrementing the reference count to the minimum value in response to said OFF switch.

13. The electric motor speed control circuit according to claim 12, further comprising:
    count memory means for storing multiple values corresponding to discrete reference count values, said multiple values being selectable through manipulation of one or more of said UP, DOWN, ON and OFF switches.

* * * * *